(12) United States Patent
Richardson

(10) Patent No.: US 8,275,213 B2
(45) Date of Patent: Sep. 25, 2012

(54) APPARATUS AND METHOD FOR GAIN CORRECTION

(75) Inventor: John Richardson, Newbury Park, CA (US)

(73) Assignee: AltaSens, Inc., Westlake Village, CA (US)

( * ) Notice: Subject to any disclaimer, the term of this patent is extended or adjusted under 35 U.S.C. 154(b) by 1088 days.

(21) Appl. No.: 12/151,947

(22) Filed: May 8, 2008

(65) Prior Publication Data

US 2009/0279809 A1 Nov. 12, 2009

(51) Int. Cl.
*G06K 9/00* (2006.01)

(52) U.S. Cl. .......................... 382/274; 382/254; 348/241

(58) Field of Classification Search .................. 382/254, 382/270–275; 348/240.1, 222.1, 308, 226.1, 348/241

See application file for complete search history.

(56) References Cited

U.S. PATENT DOCUMENTS

| | | | | |
|---|---|---|---|---|
| 6,903,670 | B1 * | 6/2005 | Lee et al. | 341/118 |
| 8,094,215 | B2 * | 1/2012 | Richardson | 348/241 |
| 2006/0114343 | A1 * | 6/2006 | Zhang et al. | 348/294 |
| 2007/0138375 | A1 * | 6/2007 | Lee et al. | 250/214 R |
| 2008/0043128 | A1 * | 2/2008 | Poonnen et al. | 348/294 |
| 2008/0055432 | A1 * | 3/2008 | Koseki | 348/241 |

OTHER PUBLICATIONS

International Search Report.
WO 98/56170 A1 (Sarnoff Corp [US] Dec. 10, 1998.
Kawahito S, et al.; "A column-based pixel-gain-adaptive CMOS image sensor for low-light-level imaging", Solid-State Circuits Conference, 2003. Digest of Technical Papers, ISS CC. 2003 IEEE International San Francisco, CA. USA Feb. 9-13, 2003, Piscataway, NJ, USA, IEEE, US Feb. 9, 2003, pp. 1-10, XP010661616, ISBN: 978-0-7803-7707-3.
Koren I, et al.; Robust digitization and digital non-uniformity correction in a single-chip CMOS camera, Solid-State Circuits Conference, 1999. ESSCIRC 1999. Proceedings of the 25$^{th}$ European Duisburg, Germany Sep. 21-23, 1999, Piscataway, NJ, USA, IEEE, Sep. 21, 1999, pp. 394-397, XP010823565, ISBN: 978-2-86332-246-8.
Search Report.

* cited by examiner

*Primary Examiner* — Wesley Tucker
(74) *Attorney, Agent, or Firm* — Reed Smith LLP

(57) ABSTRACT

An apparatus and method for digital column gain mismatch correction are described. At least one test signal pixel is added to each column in an image sensor. For each column the test signal from at least one test pixel is read and compared to a target value. A correction value is calculated based on comparing the test signal to the target value. The correction value is stored in a memory. When the regular photo-pixels are read, the photo-pixel signals are modified based on the stored correction value for each column.

8 Claims, 4 Drawing Sheets

APPARATUS AND METHOD FOR GAIN CORRECTION

BACKGROUND OF THE INVENTION

1. Field of the Invention

The present invention relates generally to CMOS image sensors, and more particularly to an apparatus and method for correcting digital column gain mismatch in CMOS image sensors.

2. Description of the Related Art

Visible imaging systems implemented using CMOS image sensors significantly reduce camera cost and power while improving resolution and reducing noise. The latest cameras use CMOS iSoC sensors that efficiently couple low-noise image detection and processing with a host of supporting blocks on a single chip.

However, CMOS imaging-Systems-on-Chip (iSoC) are prone to producing image artifacts of the analog readout architecture within the image. At each analog buffer stage, a finite offset and gain deviation may be introduced. The offset deviations result in coherent Fixed Pattern Noise (FPN) components such as "column FPN." Depending on the amplitude, column FPN may become visible in low-light conditions when high gain must be applied. Pure digital corrections are often employed to align the offsets when the mismatches in the analog domain cannot be sufficiently controlled.

In general, whether the viewer is able to perceive coherent spatial or temporal noise depends on the contrast ratio to the random pixel noise. The ideal low-light scenario may be considered to be one in which each pixel has equivalent offset and response and purely Gaussian temporal noise. Any visible departure from that situation will degrade the perceived quality of the imaging system.

In the case of offset-matching, the most difficult environment is one of complete darkness. Here, the random pixel noise is minimized since there is no photon shot noise. It has been empirically determined that for uncorrelated Gaussian noise components (i.e. with a flat spatial frequency up to the Nyquist frequency), the amplitude of any coherent row-wise or column-wise element must be less than $1/10^{th}$ of the random pixel noise, in order to appreciably degrade the image.

The situation for gain mismatch is somewhat different. In this case, the effect of darkness is not too much of a problem, the errors increase linearly with the number of integrated photons. The random pixel noise when light is present is dominated by Poisson fluctuations in the numbers of integrated photons. The magnitude of the photon shot noise is equivalent to the square root of the number of photons. Therefore, as more light is added, coherent (column-wise or row-wise) gain mismatches become harder to hide.

The most difficult scenario then for a given sensor is at the maximum possible photo-charge, i.e. the pixel full well. In order for the column-to-column gain mismatch to be invisible under all circumstances for a given sensor, a rule of thumb is that at full well, the column averages must have a sigma less than $1/10^{th}$ of the photon shot noise.

SUMMARY OF THE INVENTION

In general, an apparatus and method for digital column gain mismatch correction are disclosed. At least one test signal pixel is added to each column in an image sensor. For each column the test signal from at least one test pixel is read and compared to a target value. A correction value is calculated based on comparing the test signal to the target value. The correction value is stored in a memory. When the regular photo-pixels are read, the photo-pixel signals are modified based on the stored correction value for each column.

A method of correcting a column gain mismatch in an image sensor, the method comprises reading a test signal from at least one test pixel, comparing the test signal to a target value, calculating a correction value based on comparing the test signal to the target value, storing the correction value in a memory, reading a photo-pixel signal, and modifying the photo-pixel signal based on the correction value stored in memory.

These steps may be performed for each column in an image sensor. The method may further comprise determining a black reference value from a black reference pixel, wherein the black reference pixel is a pixel which has not been exposed to light. The at least one test pixel may comprise a plurality of test pixels, and the target value is set to an average value of a value of each test signal minus the black reference value.

Each photo-signal in a sensor can be modified according to:

$$\text{data\_out} = (\text{data\_in} - \text{blackref}) \times (1 + \Delta_i) + \text{blackref}$$

where $\Delta_i$ equals $n_i/2^s$;

$n_i$ is the signed correction values stored in the memory for each column; and s is a scaling parameter.

The value of s is set to maximize an available range of values in memory. The initial correction value can be calculated by:

$$n_i = 2^s \times (\text{target}/(\text{data\_in} - \text{blackref}) - 1)$$

An apparatus for correcting a column gain mismatch in an image sensor according to one embodiment of the present invention may comprise at least one test pixel, at least two programmable Digital-to-Analog Converters (DACs) to provide a signal voltage and a reset voltage for the at least one test pixel, a memory to store a gain correction value, and a logic circuit to process output signals from the at least one test pixel and image pixel signals from a column in the sensor. The logic circuit reads the gain correction value from memory, subtracts a black reference value from an input signal, applies the gain correction value to the input signal, determines whether the input signal is a test pixel signal or an image pixel signal, for test pixels signals, compares a corrected input signal with a target value, and based on the comparison, increases or decreases the gain correction value in memory, and for image pixels, adds the black reference value back to a corrected input signal, and outputs the result.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
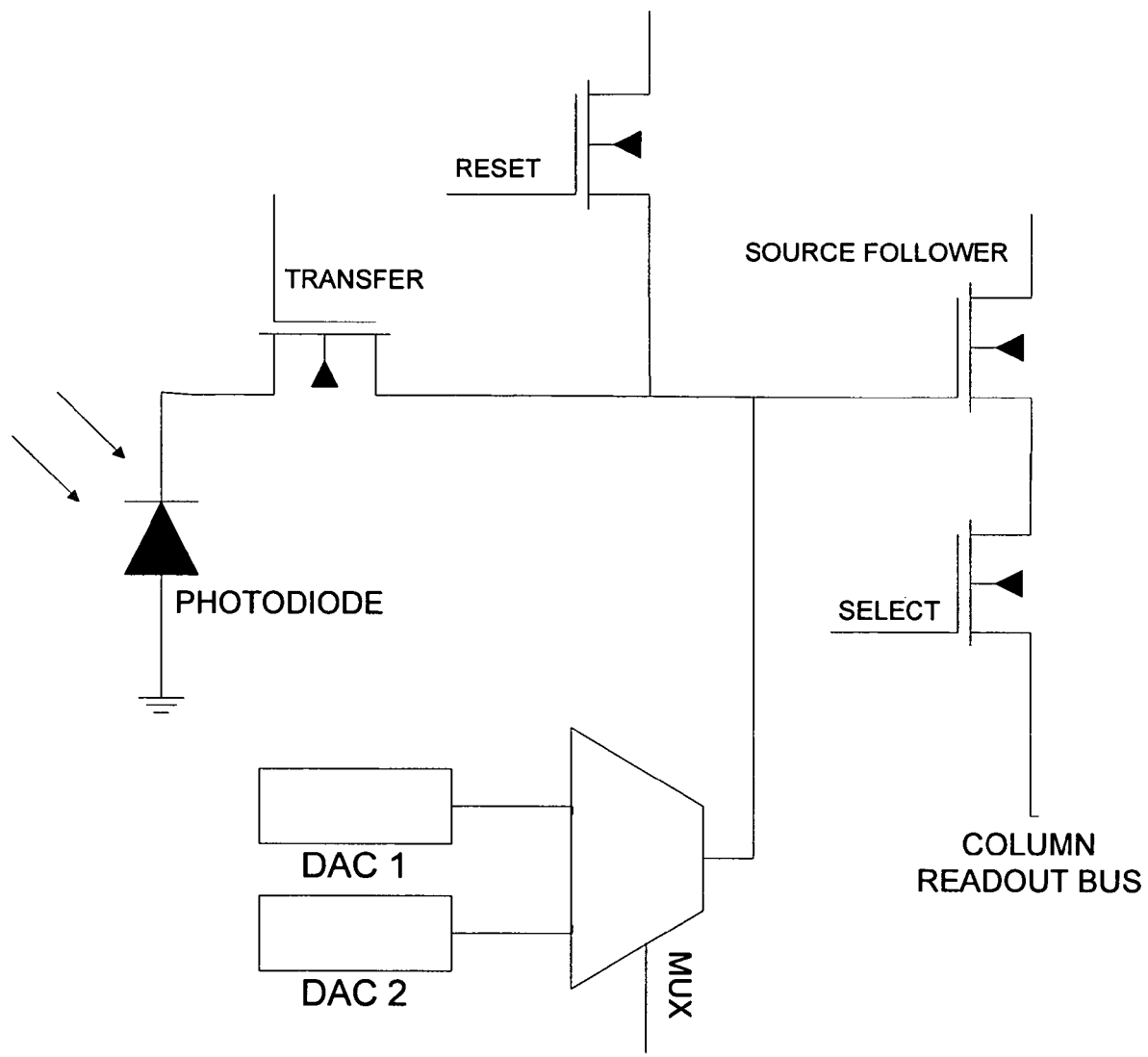
FIG. 1 is a block diagram of an implementation of a test pixel according the present invention.
Figure 2:
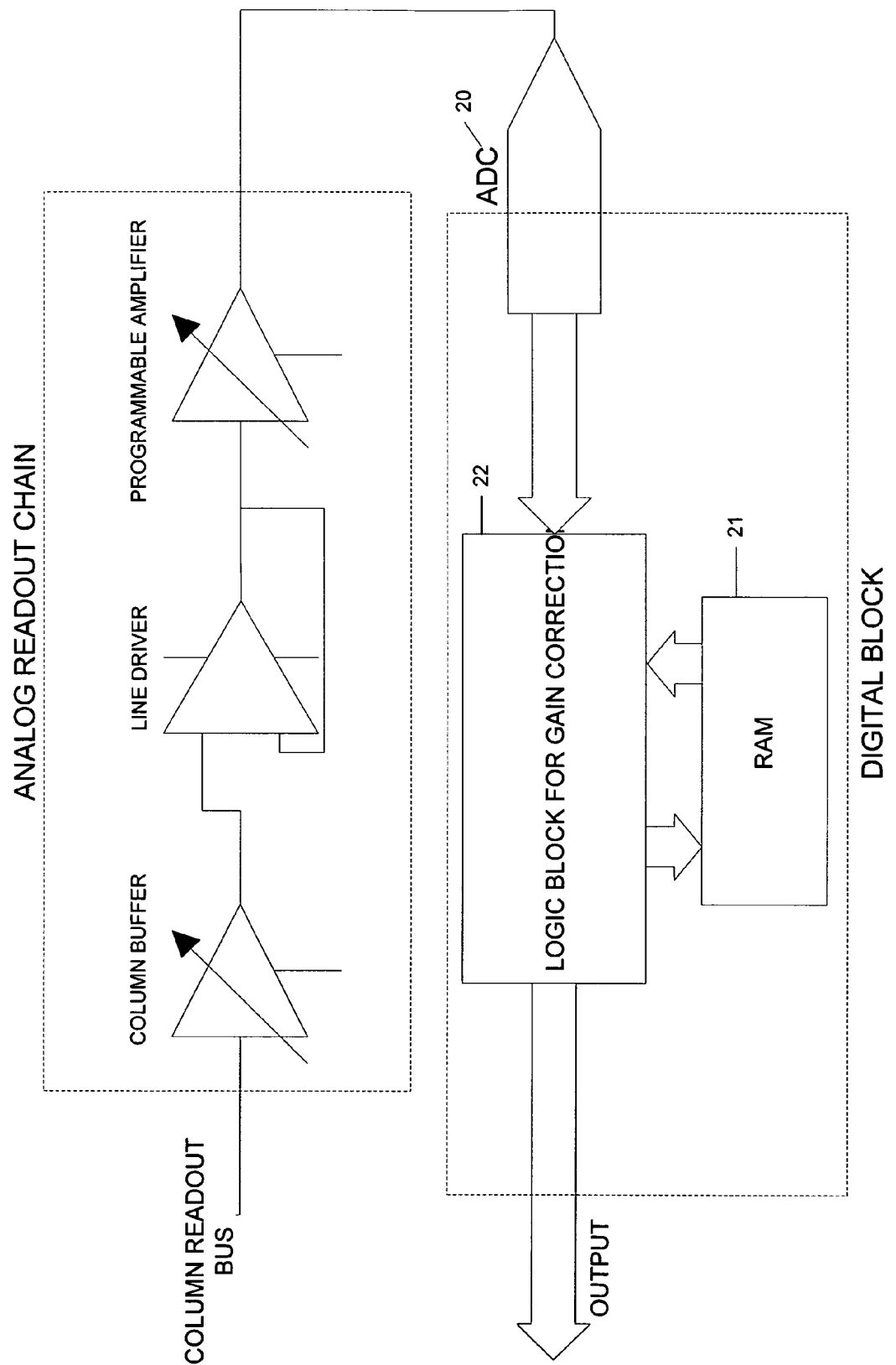
FIG. 2 is a block diagram of an apparatus according to the present invention.

For a CMOS iSoC with a standard column-wise readout architecture, a digital column-gain mismatch correction solution is disclosed. The present invention relies on the provision of at least one special purpose pixel (i.e. a test pixel), and a digital memory element per column. The at least one test pixel may be sampled every frame to facilitate a continuous adjustment which can track any dynamic changes to the raw column-wise gain pattern. A schematic of one embodiment of a test pixel in shown in FIG. 1. The source follower gates within each test pixel are connected to a dedicated net which supplies voltages that can be tuned by using two Digital-to-Analog Converters (DACs), DAC1 and DAC2. A multiplexer (MUX) is used to switch the net from one DAC voltage to another to mimic the reset and signal voltages that facilitate correlated double sampling. The two DAC voltages are tuned in order to provide a test signal covering a large percentage of the dynamic range of the Analog-to-Digital converter (ADC) 20 in the signal readout chain, shown in FIG. 2. In the digital readout path, a logic block 21 is added to distinguish between regular pixels and test pixels. The logic block 21 utilizes the test pixel data to calculate small, digital gain corrections (the corrections are signed +/−). These corrections are stored in a memory, such as RAM 22. Then, when the regular pixel data passes through the logic block, the signed corrections are used to align the column gain responses. In a preferred embodiment, the logic block is a discrete logic block designed to perform the described operations, such as those in the flowchart of FIG. 3(B). The logic block could also be implemented as a processor executing software instructions corresponding to the described operations, such as those in the flowchart of FIG. 3(B).

For a column i, the correction takes the form:

$$\text{data\_out} = (\text{data\_in} - \text{blackref}) \times (1 + \Delta_i) + \text{blackref}$$

where $\Delta_i$ has the following form:

$$\Delta_i = n_i / 2^s$$

The $n_i$ are the signed correction values stored in the memory, one per column, and s is a scaling parameter that is tuned to the match the available memory to the dynamic range of the uncorrected gain mismatch. Since the gain correction should only be applied to the actual photo-signal, a "black" reference level (blackref) is first subtracted from the data (data_in). The blackref value should be equal to the number of ADC counts registered when no light is present i.e. an output value from a black reference pixel when no light is present.

s is a register adjustable parameter which is used to tune the step size of the correction in order that optimal use is made of the memory dynamic range. Preferably, it is tuned so the actual dispersion of column offsets is perfectly accommodated by the memory space, given the number of available bits. A scan of s would be made and the column response dispersion would be measured for each point in the scan. The point with the lowest dispersion would then be selected as the standard setting. This point appears in the simulation results in FIGS. 4(A) and 4(B) as the minimum in each plot, the x axis is $1/(2^s)$. The calibration of s should be performed for each column buffer gain setting.

If the current data is from a test pixel, the gain correction is first applied. Then, the resulting value is compared to a target reference (target), which can be user adjustable. The value in memory $n_i$ is then either incremented or decremented, depending upon whether the corrected value is above or below the target reference value. The target value is set to match the actual mean value signal value (data_in−blackref) from the test pixels. This is necessary to center the gain correction within the memory dynamic and to ensure that no net bias is added to the overall gain.

Additionally, if signed divider logic is included, a fast convergence option can be used, whereby a single sample is used to make a first estimate of what the correction should be:

$$n_i = 2^s \times (\text{target}/(\text{data\_in} - \text{blackref}) - 1)$$

Figure 3A:
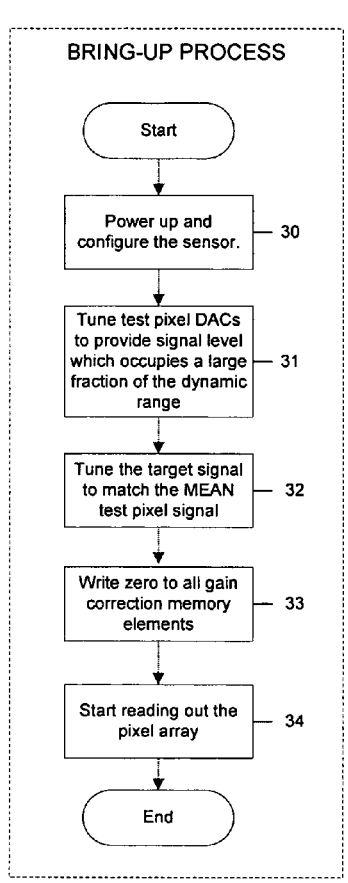
FIG. 3(A) is a flowchart illustrating an embodiment of a method according to the present invention during a start-up operation.

A flowchart illustrating one embodiment of the present invention during a system start-up is shown in FIG. 3(A). The sensor is powered up and configured (step 30). The two test pixel DACs (DAC1 and DAC2) are then tuned to provide signal levels which will occupy a large fraction of the available dynamic range (step 31). The target signal level is then tuned to match the mean test pixel signal level (step 32). The gain correction values are reset to zero in memory (step 33), and the sensor then begins to read out the signal pixels from the array (step 34).

Figure 3B:
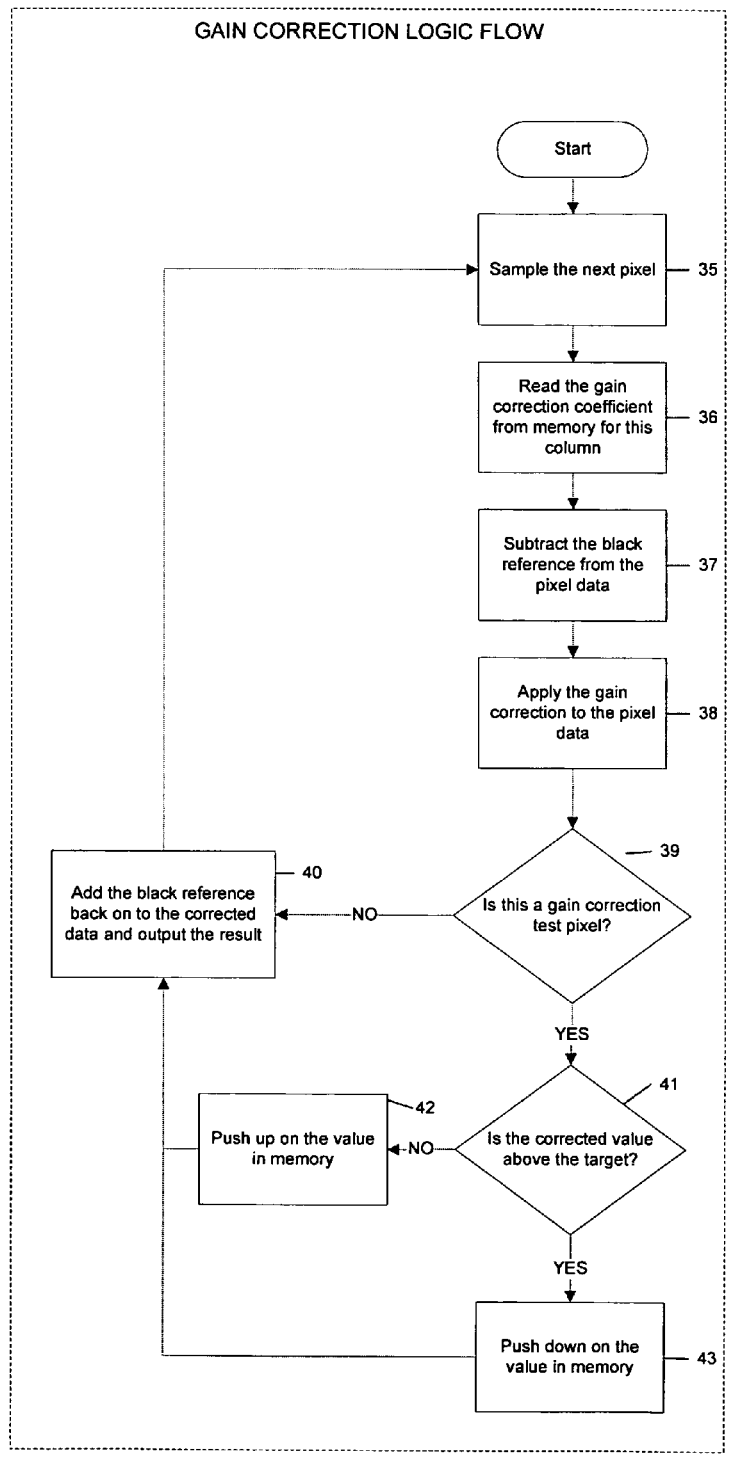
FIG. 3(B) is a flowchart illustrating an embodiment of method according to the present invention during standard sensor operation.

A flowchart for the normal gain correction processing is illustrated in FIG. 3(B). A pixel is sampled (step 35), and the gain correction coefficient stored in memory for the current column is read (step 36). The black reference value is subtracted from the pixel data (step 37), and the gain correction value is applied to the pixel data (step 38). At step 39, it is determined whether the current pixel is a gain correction test pixel. If it is, then it is determined whether the corrected value is above the target value (step 41). If the corrected value is above the target, then the value in memory is "pushed down" (step 43), otherwise the value in memory is "pushed up" (step 42). However, at step 39, if the pixel is not a gain correction pixel, then the black reference value is added back to the corrected data, and the pixel signal is output (step 40), and the processing returns to step 35 to sample the next pixel.

Figure 4B:
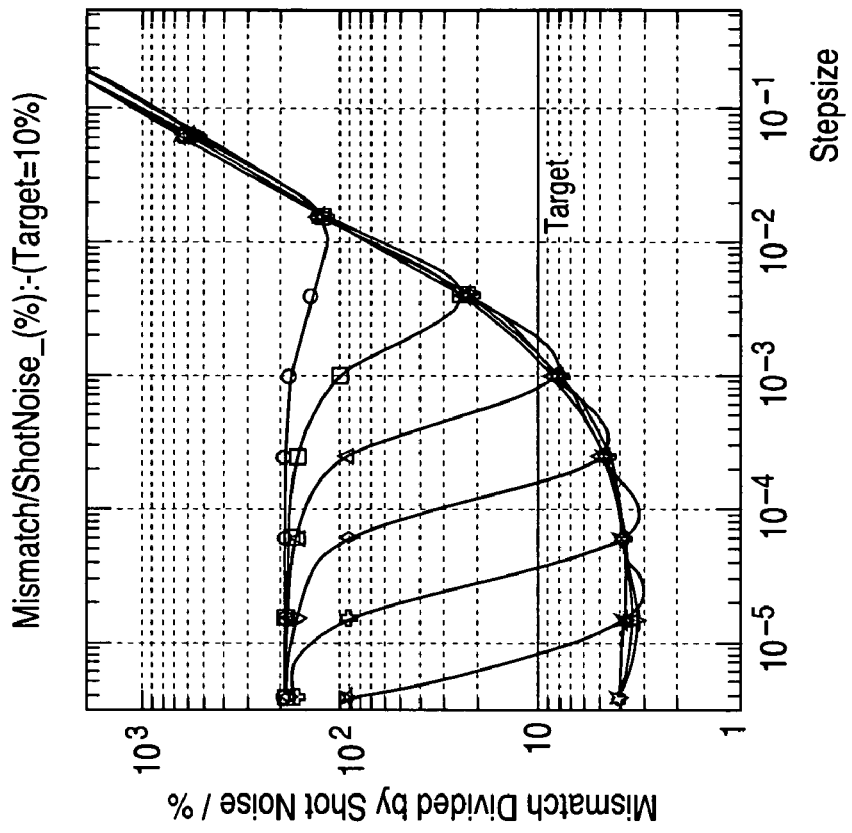
FIGS. 4(A) and 4(B) are graphs illustrating the required memory bit depth for implementing the gain correction scheme of the present invention.
Figure 4A:
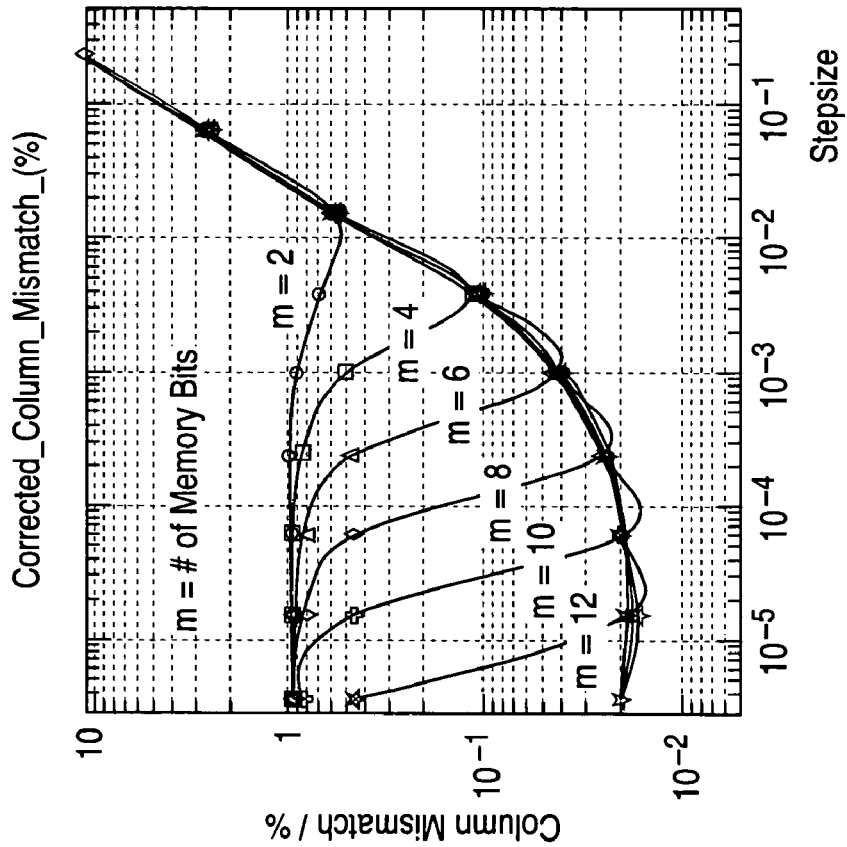

The requirement that any column mismatch be masked by the photon shot noise has the result that the required memory depth depends on two factors: the initial column mismatch present in the analog domain and the maximum photo-charge (full well). The simulation shown in FIGS. 4(A) and 4(B), illustrate the impact of the available memory depth (i.e. in bits) on the quality of a gain correction. For example, a sensor with a column matching sigma of 1.0% was simulated at a full well of 35,000e−. The scaling parameter, s, was scanned for each memory depth to find the optimal tune point. The quantity shown on the x-axes on a log scale is $\frac{1}{2^s}$. The graph in FIG. 4(A) shows the corrected column mismatch as a percentage on a log scale. The graph in FIG. 4(B) has the ratio of the column mismatch to photon shot noise. The target performance is that the curve be below 10% on this graph. For these conditions, it can be shown that a memory depth of six bits would suffice.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. An electronic method of correcting a column gain mismatch in an image sensor, implemented in circuitry to perform the method, the method comprising:
   reading a test signal from at least one test pixel in the image sensor;
   comparing the test signal to a target value;
   calculating a correction value based on comparing the test signal to the target value;
   storing the correction value in a memory;
   reading a photo-pixel signal;
   determining a black reference value from a black reference pixel, wherein the black reference pixel is a pixel which has not been exposed to light; and
   modifying the photo-pixel signal based on the correction value stored in memory and the black reference value, in order to form a modified photo pixel signal; and
   outputting the modified photo-pixel signal;
   wherein for each column in the sensor, each photo-signal is modified according to:

data out=(data in−blackref)×(1+$\Delta_i$)+blackref where $\Delta_i$ equals $n_i/2^s$;
   $n_i$ is the signed correction values stored in the memory for each column; and
   s is a scaling parameter.

2. The method of claim 1, wherein the steps are performed for each column in an image sensor.

3. The method of claim 2, wherein the at least one test pixel comprises a plurality of test pixels.

4. The method of claim 3, wherein the target value is set to an average value of a value of each test signal minus the black reference value.

5. The method of claim 4, wherein the correction value is a signed correction value.

6. The method of claim 5, wherein s is set to maximize an available range of values in memory.

7. The method of claim 6, wherein an initial correction value can be calculated by:

$n_i = 2^{s \times (target/(data_{13}in - blackref) - 1)}$.

8. An apparatus for correcting a column gain mismatch in an image sensor, the apparatus comprising:
   at least one test pixel;
   at least two programmable Digital-to-Analog Converters (DACs) to provide a signal voltage and a reset voltage for the at least one test pixel;
   a memory to store a gain correction value; and
   a logic circuit to process output signals from the at least one test pixel and image pixel signals from a column in the sensor;
   wherein the logic circuit:
      reads the gain correction value from memory;
      subtracts a black reference value from an input signal;
      applies the gain correction value to the input signal;
      determines whether the input signal is a test pixel signal or an image pixel signal;
      for test pixels signals, compares a corrected input signal with a target value, and based on the comparison, increases or decreases the gain correction value in memory; and
      for image pixels, adds the black reference value back to a corrected input signal, and outputs the result;
   wherein the logic circuit processes the output signals according to the formula:

data_out=(data_in−blackref)×(1+$\Delta_i$)+blackref where blackref is the black reference value;
   $\Delta_i$ equals $n_i/2^s$;
   $n_i$ is the signed correction values stored in the memory for each column; and
   s is a scaling parameter.

* * * * *